(12) United States Patent
Fidan et al.

(10) Patent No.: US 10,618,353 B2
(45) Date of Patent: *Apr. 14, 2020

(54) BIELASTIC ARAMID TIRE CORD AS CARCASS REINFORCEMENT

(71) Applicant: Kordsa Teknik Tekstil Anonim Şirketi, Kocaeli (TR)

(72) Inventors: M.Sadettin Fidan, Kocaeli (TR); Kürsat Aksoy, Kocaeli (TR); Bahadir Kaya, Kocaeli (TR)

(73) Assignee: KORDSA TEKNIK TEKSTIL ANONIM SIRKETI, Kocaeli (TR)

( * ) Notice: Subject to any disclaimer, the term of this patent is extended or adjusted under 35 U.S.C. 154(b) by 151 days.

This patent is subject to a terminal disclaimer.

(21) Appl. No.: 15/740,809

(22) PCT Filed: Jul. 1, 2016

(86) PCT No.: PCT/TR2016/050217
§ 371 (c)(1),
(2) Date: Dec. 29, 2017

(87) PCT Pub. No.: WO2018/004488
PCT Pub. Date: Jan. 4, 2018

(65) Prior Publication Data
US 2019/0337335 A1    Nov. 7, 2019

(51) Int. Cl.
*B60C 9/00* (2006.01)
*B60C 9/04* (2006.01)
*D02G 3/48* (2006.01)
*D07B 1/02* (2006.01)

(52) U.S. Cl.
CPC .............. *B60C 9/0042* (2013.01); *B60C 9/04* (2013.01); *D02G 3/48* (2013.01); *D07B 1/025* (2013.01); *B60C 2009/0092* (2013.01); *B60C 2009/0425* (2013.01); *B60C 2009/0475* (2013.01); *D07B 2501/2046* (2013.01)

(58) Field of Classification Search
CPC ...... D02G 3/48; B60C 9/0028; B60C 9/0042; B60C 9/005; B60C 9/04; D07B 1/025
See application file for complete search history.

(56) References Cited

U.S. PATENT DOCUMENTS

| | | |
|---|---|---|
| 3,911,662 A | 10/1975 | Fenner |
| 4,155,394 A | 5/1979 | Bhakuni et al. |
| 4,749,016 A | 6/1988 | Kojima et al. |
| 4,850,412 A | 7/1989 | Gupta |
| 7,484,545 B2 | 2/2009 | Westgate et al. |
| 2005/0051251 A1 | 3/2005 | Sinopoli et al. |
| 2005/0098253 A1* | 5/2005 | Doujak .................. D07B 1/062 152/527 |
| 2007/0130905 A1* | 6/2007 | Kish ........................ D02G 3/48 57/237 |

(Continued)

*Primary Examiner* — Shaun R Hurley
(74) *Attorney, Agent, or Firm* — Bayramoglu Law Offices LLC

(57) ABSTRACT

The present invention relates to a novel tire cord reinforcement made of ultra high modulus aramid fibers which has bi-elastic tensile properties. The cord includes at least two plies, and there is a spacing between the cord plies. The cord twisting improves bending and compression fatigue resistance of the aramid, but at the same time reduces the modulus and strength too.

6 Claims, 9 Drawing Sheets

(56) References Cited

U.S. PATENT DOCUMENTS

| | | | |
|---|---|---|---|
| 2010/0009116 A1* | 1/2010 | Takeda | B29C 70/16 |
| | | | 428/114 |
| 2014/0223879 A1 | 8/2014 | Lee et al. | |
| 2014/0360648 A1 | 12/2014 | Assaad et al. | |
| 2015/0174968 A1* | 6/2015 | Huyghe | B60C 15/04 |
| | | | 152/540 |
| 2015/0246580 A1* | 9/2015 | Sevim | B60C 9/0042 |
| | | | 442/182 |
| 2018/0312004 A1* | 11/2018 | Fidan | B60C 9/0028 |
| 2018/0313004 A1* | 11/2018 | Fidan | B60C 1/0016 |
| 2019/0030956 A1* | 1/2019 | Fidan | B60C 1/0016 |

* cited by examiner

BIELASTIC ARAMID TIRE CORD AS CARCASS REINFORCEMENT

CROSS REFERENCE TO RELATED APPLICATIONS

This application is the national phase entry of International Application No. PCT/TR2016/050217, filed on Jul. 1, 2016, the entire content of which is incorporated herein by reference.

TECHNICAL FIELD

The present invention relates to a novel two or more ply aramid tire cord reinforcement which contain adhesive dip not only on the cord surface, but also between their plies. Such a novel inter-ply dip penetrated bi-elastic tire cord improves high speed durability and eliminates flatspotting when used as carcass reinforcement (body ply) in pneumatic radial and bias tires.

BACKGROUND OF THE INVENTION

It is well known that the conventional textile tire reinforcements are two or three-ply cords having closed plies, which means, each individual ply has interface contact with each other. Such textile cords, for example, can be rayon, polyester, nylon and aramid/nylon hybrid cords in pneumatic radial and bias tires.

The aramid/nylon hybrid cords having bi-elasic tensile properties comprising high modulus aramid and low modulus nylon yarns have improved bending fatigue resistance compared to the aramid cord with comparable constructional parameters like total dtex, and twist multiplier. The cushion effect of the low modulus nylon (less abrasion between the cord plies) improves the fatigue resistance of aramid/nylon hybrid cords.

U.S. Pat. No. 4,155,394 describes a composite (hybrid) cord suitable for tire reinforcement comprised of a plurality of plies of yarns selectively cabled in a manner so that, upon application of longitudinal stress, at the initial elongation of the cable, the primary load bearing ply is a polyester or a nylon yarn and so that after appreciable elongation of the cable, the primary load bearing yarn is an aramid yarn. The invention further relates to a pneumatic tire, industrial belt or hose having a carcass containing a fabric of such a cord as a reinforcing member.

U.S. Pat. No. 7,484,545 describes heavy dtex hybrid cords having high modulus aramid and low modulus nylon as carcass and crown reinforcement in radial aircraft tires. The breaking strength of such hybrid cords are higher than 1050N and elongation at break values are higher than 12 and less than 20%.

US Patent No. 2014/0360648 describes a carcass cord consisting of one single aramid first yarn twisted helically about one single polyester second yarn. The first yarn and second yarn have different moduli of elasticity. The first yarn has a modulus greater than the modulus of the second yarn.

SUMMARY OF INVENTION

The invention relates to a two or more ply cord reinforcement made of aramid yarn having bielastic tensile properties. Namely, low initial modulus and high modulus after initial elongation. In order to prevent excessive modulus and breaking strength loss, high level of cord twisting has been avoided.

The production principle of the transformation of linear tensile behaviour of the aramid cord to bielastic characteristic is based on the opening the cord plies and insertion of RFL adhesive in it. The aramid cord having RFL between its opened plies shows bielastic tensile behaviour under tension.

Definitions

Cord: The product formed by twisting together two or more plied yarns Cord ply: Plied single yarns within cord.

Dtex: The gram weight of yarn having 10.000 meter length.

Flatspotting: Cords in tire having low Tg and high thermal shrink force is subjected to shrinkage at footprint. When cooled in this position, the cord maintains flatspot until it again reaches its Tg in use.

Greige cord: Twisted cord before dipping and heat-setting

Heat-setting: The process of conferring dimensional stability and heat resistance to the yarns, cords or fabrics by means of either moist or heat.

Heat-set cord: Cord exposed to high temperature (e.g. 120° C. to 260° C. under tension)

Linear density: Weight per unit length as g/dtex or g/d (denier)

Spacing(s): Mutual ply-to-ply distance within a multi-ply twisted cord

TASE at 1.0% elongation: Stress at 1.0% elongation as cN/dtex

Tenacity: Breaking force (N) divided by linear density (dtex)

Tg: Glass transition point of polymer

Total nominal cord dtex: Sum of nominal yarn linear densities (3340 dtex for 1670×2 cord)

Twist: Number of turns about its axis per meter of a yarn or cord (t/m or tpm)

Ultra high modulus yarn: Tensile modulus higher than 100 GPa

BRIEF DESCRIPTION OF THE DRAWINGS

FIG. 7A-7H describes the opening of the cord cross-sections and subsequent dip penetration between the cord plies for two and three-ply aramid cords, in which FIGS. 7A and 7B are cross-sectional views of two and three-ply aramid cords in closed-plies form, FIGS. 7C and 7D are cross-sectional views of two and three-ply aramid cords in opened-plies form, FIGS. 7E and 7F are cross-sectional views of two and three-ply aramid cords in dip impregnated form according to invention.

FIGS. 7G and 7H are adhesive dip (RFL) filling the openings between the plies and covering the cord surface.

DETAILED DESCRIPTION OF THE INVENTION

Figure 1:
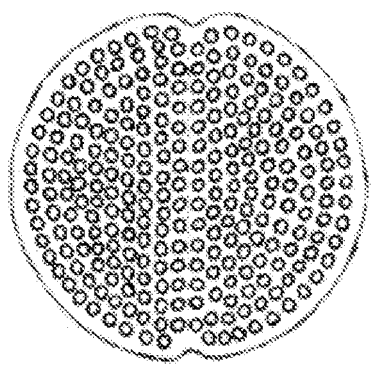
FIG. 1 is a cross-sectional view of a conventional (prior art) two-ply aramid cord.
Figure 2:
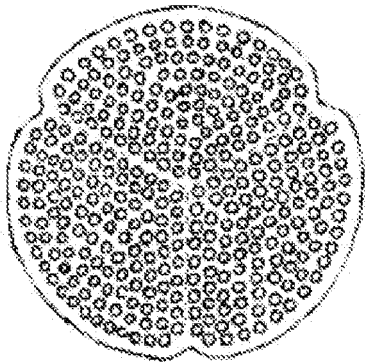
FIG. 2 is a cross-sectional view of a conventional (prior art) three-ply aramid cord.

Aramid with its ultra high modulus and high strength is very dimensionally stable material. Due to its highly crystalline microstructure, it does not show any significant thermal shrinkage when exposed to high temperature. In twisted form as two or three-ply cord, it can be used as reinforcement in tires and mechanical rubber goods like V-belts (FIG. 1 and FIG. 2).

The cord twisting improves bending and compression fatigue resistance of the aramid, but at the same time reduces the modulus and strength too.

Figure 3:
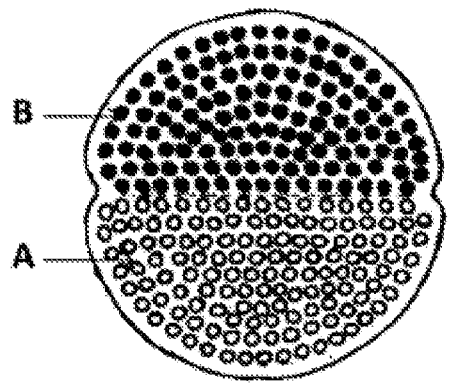
FIG. 3 is a cross-sectional view of a conventional (prior art) two-ply hybrid cord in which, A is aramid ply (yarn), B is nylon ply (yarn).
Figure 4:
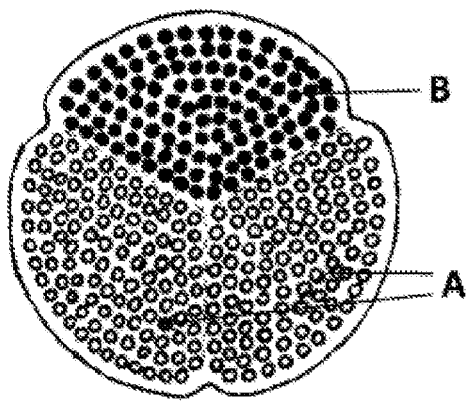
FIG. 4 is a cross-sectional view of a conventional (prior art) three-ply hybrid cord in which, A is aramid ply (yarn) and, B is nylon ply (yarn).

Aramid/Nylon hybrid cords can be used as carcass reinforcement in radial aircraft tires and bias truck tires to reduce the number of plies and rubber (FIG. 3 and FIG. 4). By reducing number of of carcass layers (plies), the total gauge at sidewall becomes thinner and flexible. On the other hand, tire with less rubber becomes lighter and cooler under dynamic conditions due to less rubber hysteresis.

Figure 5:
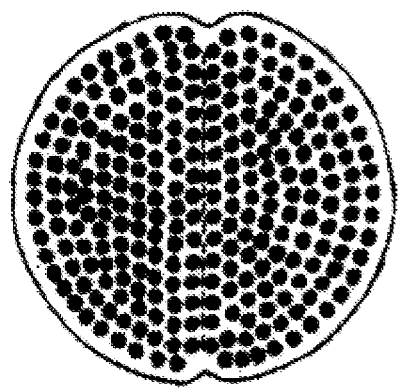
FIG. 5 is a cross-sectional view of a conventional (prior art) two-ply nylon cord.
Figure 6:
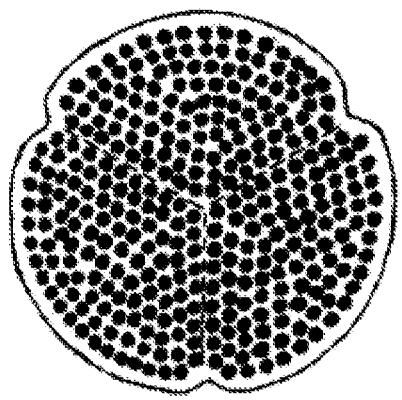
FIG. 6 is a cross-sectional view of a conventional (prior art) two-ply nylon cord.
Figure 7A:
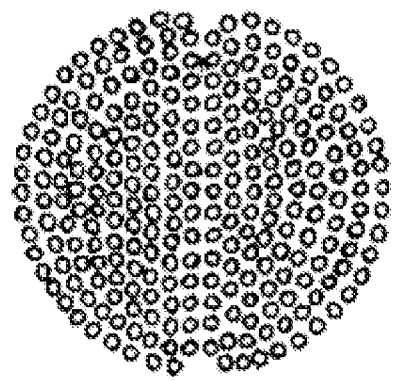
Figure 7B:
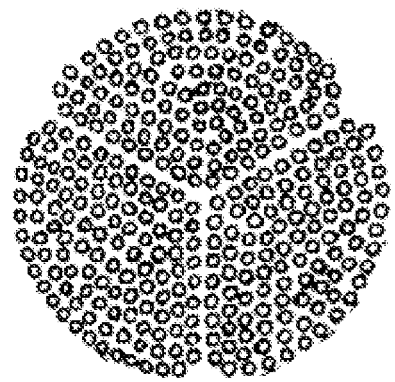
Figure 7C:
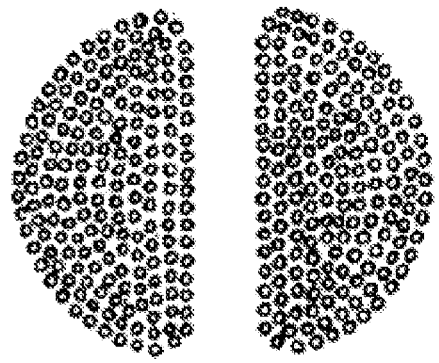
Figure 7D:
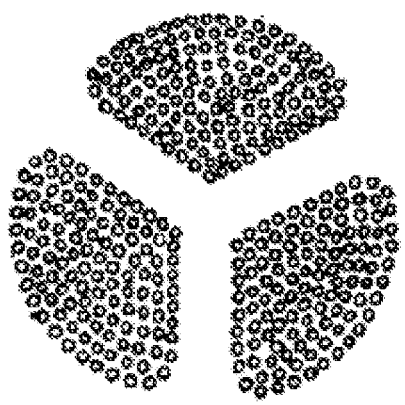
Figure 7E:
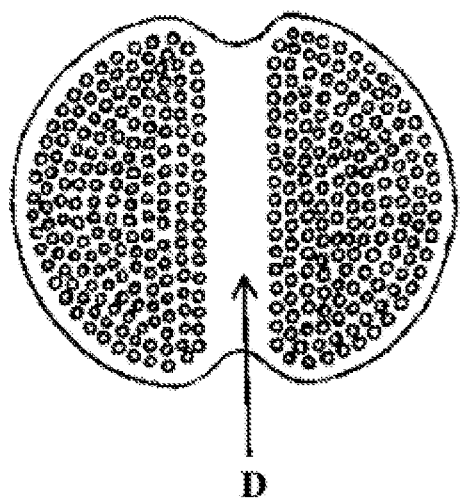
Figure 7F:
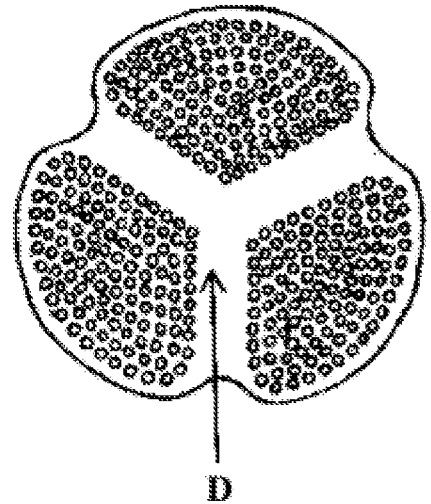
Figure 7G:
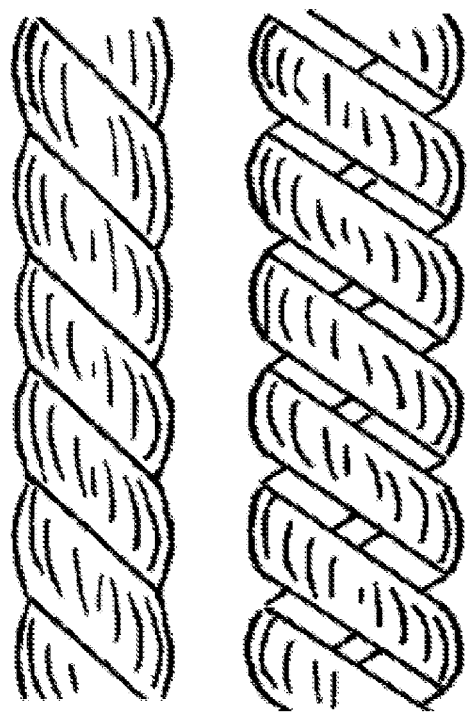
Figure 7H:
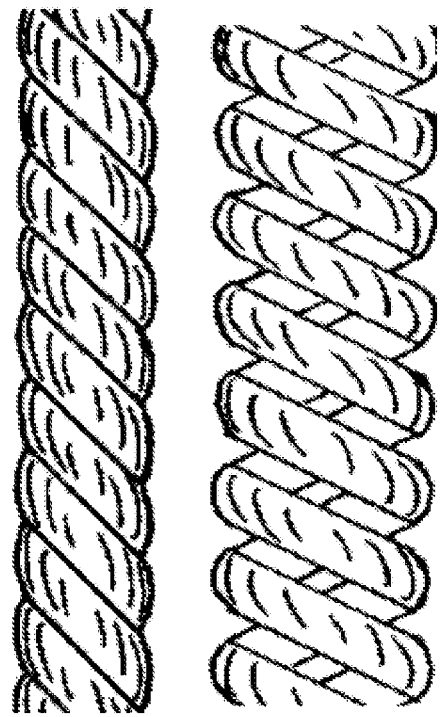

Two or three-ply nylon 6 and 6.6 cords (FIG. 5 and FIG. 6) are well known reinforcements as carcass in radial aircraft tires and bias truck tires, but due to lower breaking strength (tenacity) of nylon cords, it is necessary to use several carcass layers in such tires. Interlaminar shear strains between such carcass layers cause heat build up and temperature rise resulting in early ply separations and tire failures.

According to the present invention, two or more ply aramid cords without any low modulus component ply like nylon, can be produced with bielastic tensile properties (FIG. 7A-7H). Such novel bi-elastic aramid cords can be used as carcass reinforcement in radial and bias tires with improved high speed durability and without any flatspotting.

Figure 11:
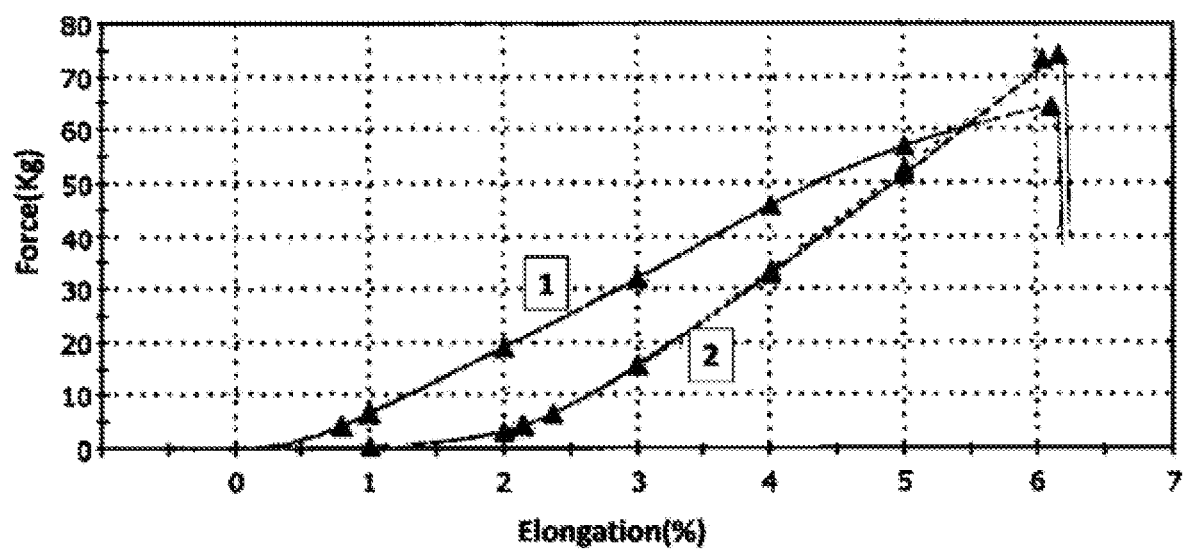
FIG. 11 shows load-elongation curves of aramid cords in which, curve 1 is 1670 dtex/3 dipped aramid cord having Z/S, 320/320 tpm twist (prior art) having linear tensile characteristic, curve 2 is 1670 dtex/3 aramid cord having Z/S, 320/280 tpm (40 tpm back-twisted in Z direction) and dipped having bielastic tensile characteristic according to invention.

According to invention, the basic production principle of the bielastic aramid cord is to open the cord plies and insertion of the adhesive between the plies. The aramid cord containing high content of adhesive like RFL between its plies becomes extensible with low forces and during this extension the aramid cord plies applies compressive forces to the adhesive material (RFL) and squeeze it. During this squeezing process cord elongates with low forces. After aramid cord plies having been approached to each other, aramid cord resist to elongation and it becomes ultra high modulus cord again (FIG. 11).

Figure 8A:
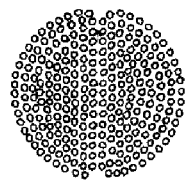
FIG. 8A are respectively lateral and cross-sectional views of conventional two-ply aramid cord.
Figure 8B:
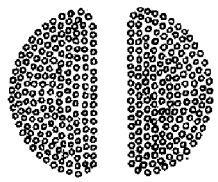
FIG. 8B are respectively lateral and cross-sectional views of two-ply aramid cord in opened form according to invention (before dipping step).
Figure 9A:
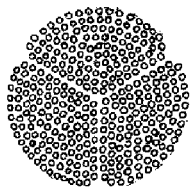
FIG. 9A are respectively lateral and cross-sectional views of conventional three-ply aramid cord FIG. 9B are respectively lateral and cross-sectional views of three-ply aramid cord in opened form according to invention (before dipping step).
Figure 9B:
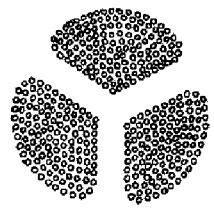

In order to obtain a bi-elastic tensile characteristics, the aramid cord plies can be opened with different methods:

a—The two or more ply greige aramid cords are heat-set at a temperature between 120° C. and 260° C. and after cooling down they are partially back-twisted in opposite direction of cord twist. During this back-twisting process, the cord plies are opened (FIGS. 8-10) The aramid cords with its opened plies are dipped and heat set again, and during this process the voids between cord plies are filled with dip solution and the external surface of the cord plies are also covered dip solution.

b—The two or more ply greige aramid cords are dipped and heat-set at a temperature between 120° C. and 260° C. and after cooling down they are partially back-twisted in opposite direction of cord twist. During this back-twisting process, the cord plies are opened. The aramid cords with their opened plies are dipped and heat set again, and during this process the voids between cord plies are filled with dip solution and the external surface of the cord plies are also covered additional dip solution.

c—The two or more ply aramid cords are subjected to axial compression during dipping process, and the cords with opened plies under compression absorbs dip solution between the open cord plies. After dipping process, the aramid cord with penetrated dip solution between the plies are dried and heat set between 120° and 260° C.

Figure 10A:
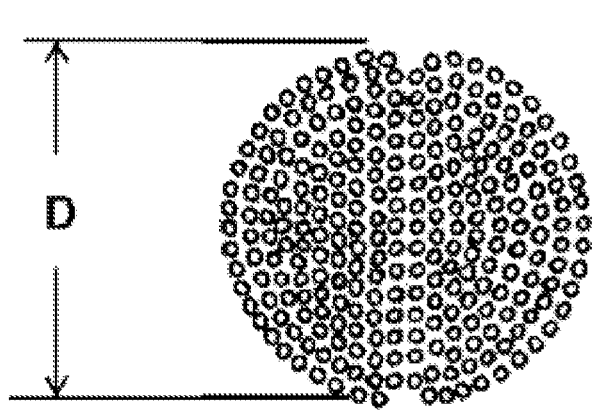
FIG. 10A-10D are cross-sectional views of closed and opened forms of cord plies. D is cord diameter and s is spacing (opening) between cord plies.
Figure 10B:
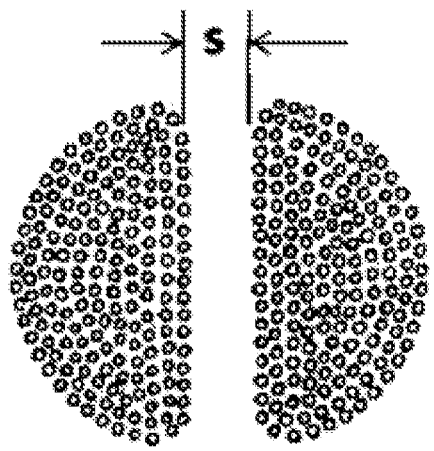
Figure 10C:
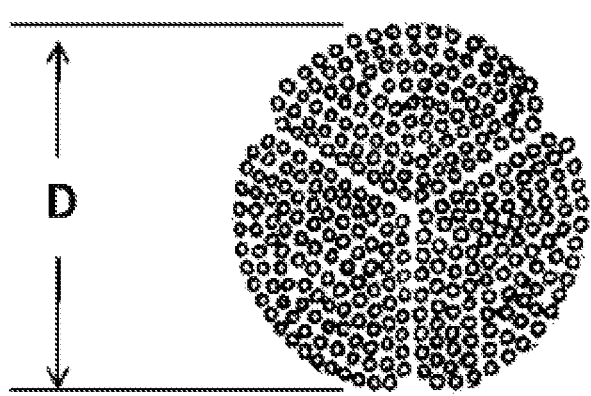
Figure 10D:
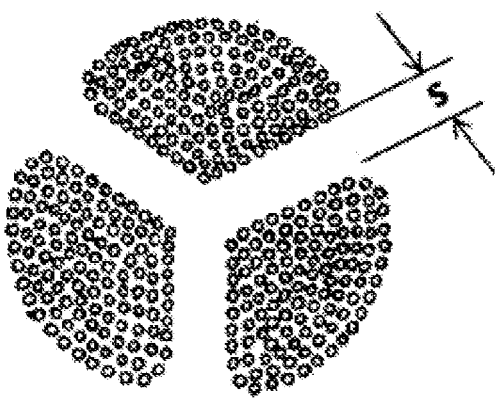

The tensile bi-elasticity characteristic of the aramid cord can changed with the ply opening degree(s) in FIG. 10B and FIG. 10D), dip type, dip content between the plies and the curing degree of the dip at high temperature (dip hardness).

According to invention, two or more ply aramid cord has less than 2.0 cN/dtex TASE value at 1.0% elongation determined in accordance with ASTM D885-16 and the spacing(s) between the cord plies which is filled with adhesive dip, is higher than 0.1×D and less than 0.5×D.

The aramid cords with 1.0% TASE higher than 2.0 cN/dtex have not enough extensibility and bending (flexural) fatigue resistance.

Preferably, s is higher than 0.2×D and less than 0.4×D.

According to invention, the dip pick up (DPU) in the dipped cord is higher than 10% and less than 50%, preferably, higher than 15% and less than 35%, by weight.

Less than 10% DPU can not totally fill the the openings between the cord plies, and higher than 50% DPU leads to too thick cord diameters.

According to invention, the twist factor of the cord is higher than 10,000 and less than 25,000 which is determined based on the following formula;

Twist factor=cord twist (tpm)×square root of total nominal cord dtex    (1)

The cords with lower than 10,000 twist factor have insufficient fatigue resistance under bending and the cords with higher than 25,000 twist factor have significant modulus reductions.

According to invention, the total nominal cord linear density is higher than 600 dtex and less than 6000 dtex.

The cords having less than 600 dtex are not effective enough, and the cords having higher than 6000 dtex are too thick.

What is claimed is:

1. A dipped and heat-set aramid cord, comprising a plurality of plies having a spacing between the plurality of cord plies, wherein a TASE at 1.0% elongation of the aramid cord is less than 2.0 cN/dtex, wherein the spacing between the plurality of cord plies is more than 10% and less than 50% of a cord diameter (D) of the cord plies.

2. The dipped and heat-set aramid cord according to claim 1, wherein the spacing between the plurality of cord plies of the aramid cord is more than 20% and less than 40% of the cord diameter (D).

3. The dipped and heat-set aramid cord according to claim 1, wherein an adhesive dip pick-up (DPU) of the aramid cord is higher than 10% and less than 50% by weight.

4. The dipped and heat-set aramid cord according to claim 1, wherein an adhesive dip pick-up (DPU) of the aramid cord is higher than 15% and lower than 35% by weight.

5. The dipped and heat-set aramid cord according to claim 1, wherein the aramid cord has a twist factor in between 10,000 and 25,000.

6. The dipped and heat-set aramid cord according to claim 1, wherein the aramid cord has a total nominal linear density in between 600 dtex and 6,000 dtex.

\* \* \* \* \*